Patented Aug. 17, 1937

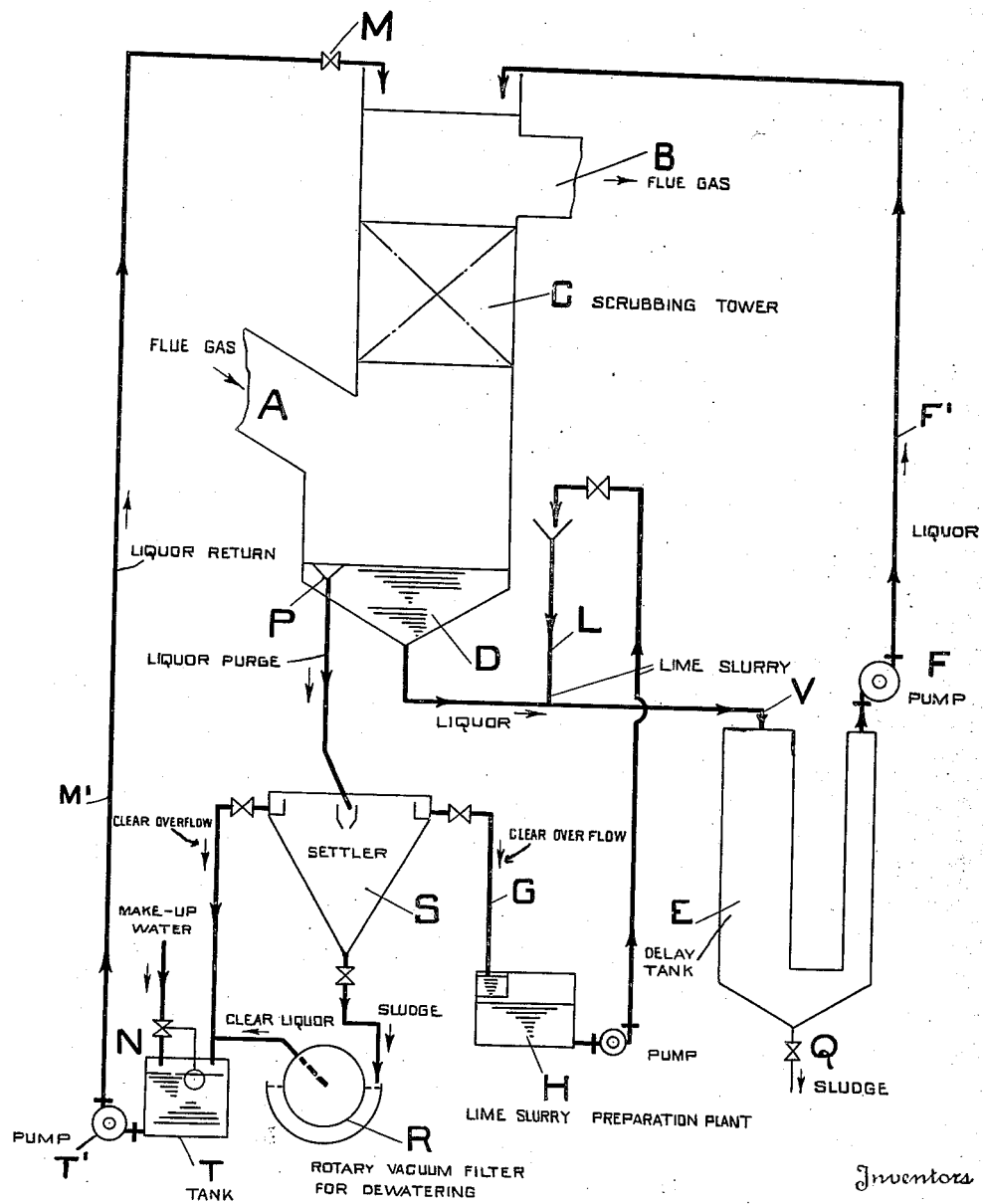

2,090,143

UNITED STATES PATENT OFFICE 2,090,143

GAS WASHING

Gordon Nonhebel and John Lindon Pearson, Norton-on-Tees, England, assignors to Imperial Chemical Industries Limited, a corporation of Great Britain Application March 4, 1935, Serial No. 9,350
In Great Britain March 10, 1934

4 Claims. (Cl. 23—2)

This invention relates to the wet purification of gases, in particular waste flue gases for the removal of oxides of sulphur, and any smoke and ash present, by scrubbing such gases with recirculated aqueous washing media in a system in which lime or chalk is continuously added in amount approximately equivalent to the absorbed sulphur oxides and in which the insoluble solids collecting in the system, principally ash, calcium sulphite and calcium sulphate, are removed by purging off a part only of the recirculating liquor.

The present invention is concerned with the prevention of scaling upon the surfaces of the scrubber, which presents a serious problem when lime, chalk or an alkali such as magnesian limestone which contains lime is added to the system. In the description here given the word lime is to be taken to mean any of these substances.

In any scrubbing system of the type described, the liquor entering the scrubber is saturated or nearly saturated with calcium sulphite and/or sulphate, and contains suspended calcium carbonate and dissolved bicarbonate. If the make-up water added to replace losses in the recirculating system due to evaporation and due to losses with the rejected mud, is relatively small, the recirculating liquor will become saturated or supersaturated with respect to calcium sulphite and sulphate during the latter part of its passage through the scrubber. This is particularly the case when the above-mentioned purge is clarified in a settler or similar apparatus and when the liquor so clarified is returned to the recirculating system, and when the liquor rate is just enough to secure the desired degree of absorption of oxides of sulphur and dust.

Calcium sulphite and sulphate readily form supersaturated solutions and it is found that the liquor leaving the scrubber is supersaturated with respect to these salts when the amount thereof formed in the scrubber is in excess of the amount required to saturate the make-up water.

Moreover, when the lime is added to the recirculating liquor the pH of the solution is raised and this increase in pH lowers the solubility of the calcium sulphite in the liquor, with the result that the solution may become supersaturated with respect to this salt even in cases when the decrease in pH in the scrubber itself so increases the solubility of calcium sulphite that no saturation or supersaturation with respect to this salt occurs within the scrubber.

It is known that supersaturation can be substantially prevented or destroyed by seeding with crystals of the salt with respect to which the solution is supersaturated, or with crystals of an isomorphous salt. We have found, however, that in a gas purification process of the type described supersaturation can occur at or towards the base of the scrubber and cause scaling of the scrubbing surfaces in a normal scrubbing system of relatively small total liquor capacity, even when the solids retained in the recirculating liquor system are sufficient to give concentrations of suspended calcium sulphite and sulphate of over 5% each. Moreover, in practice, there is a limit to the quantity of suspended solids which may be carried in the liquor, especially through the scrubber, and also it is uneconomical to increase the amount of make-up water to such an extent as to avoid supersaturation.

In our co-pending application No. 759,397 filed 27th December, 1934, we have described a method of preventing scale formation which comprises treating the liquor after leaving the scrubber so as to remove practically the whole of the supersaturation of the liquor due to calcium sulphite and sulphate before recirculating it over the scrubbing surfaces. The present invention is based upon the observation that in order to derive the greatest advantage from the said method, care must be taken to employ such a liquor rate that the degree of supersaturation existing in the liquor at the base of the scrubber does not exceed certain values, which are different for calcium sulphite and sulphate and which depend upon the material of which the scrubbing surfaces are made.

We have found that when the scrubbing surfaces are made of non-corroding materials such as wood, synthetic resin, stainless steel or hard copper, scaling is completely prevented if the degree of supersaturation of the liquor at the base of the scrubber is not greater than 4 milligram equivalents per litre of calcium sulphite and not greater than 3 milligram equivalents per litre of calcium sulphate. For materials such as mild steel, brass or aluminium bronze, which tend to corrode slightly under the conditions of working, the degree of supersaturation must not be greater than 2.8 milligram equivalents per litre of calcium sulphite and 2 milligram equivalents per litre of calcium sulphate. The figures given for the supersaturation values do not refer to the total amount of calcium sulphite and sulphate in solution, but to the excess over the equilibrium value, i. e., the amount causing saturation.

According to our invention, therefore, in a process of the kind described, in which the liquor is treated after leaving the scrubber so as to remove practically the whole of the supersaturation of the liquor due to calcium sulphite and sulphate before recirculating it over the scrubbing surfaces, we control the liquor rate and/or the addition of make-up water so that the degree of supersaturation of the liquor at the base of the scrubber does not exceed the least value referred to in the preceding paragraph and applicable to the particular scrubbing surfaces employed.

The removal of the supersaturation of the liquor leaving the scrubber may be effected as described in the co-pending application No. 759,397, by delaying the return of the liquor to the scrubber for a definite minimum time. Thus a large liquor capacity (delay tank) may be included in the system, preferably taking the form of a separate vessel which is placed immediately after the point of addition of the lime.

The lime is preferably added to the liquor immediately after it leaves the scrubber so as to assist the precipitation of calcium sulphite in the delay tank, the solubility of the calcium sulphite being substantially depressed as a result of the increase of pH of the liquor due to the addition of lime. The pH of the liquor may be still further raised by removing dissolved carbon dioxide from the scrubbing liquor, for example by stirring in a tank open to the atmosphere or by stripping the liquor of $CO_2$ by the application of heat and/or reduced pressure or by passing suitable gases substantially free from $CO_2$ through the liquor.

The delay tank itself may be employed for the purpose of removing the dissolved $CO_2$, or a separate stirred tank may be used. Alternatively, the stripping of the liquor may be accomplished by introducing air into the scrubber, at a point below the gas inlet in the case of counter-current scrubbing, and causing the air to contact intimately with the liquor over a shallow depth of packing arranged between the air and gas inlets. If desired, however, a separate stripping vessel may be used, in which any suitable gas is made to contact with the liquor. The stripping may be done before or after the addition of lime to the liquor, but must in any case be done either in the delay tank or before this point in the cycle.

Apparatus suitable for use in carrying out the novel process of this invention is illustrated diagrammatically by way of example in the accompanying drawing, such apparatus being disclosed and claimed in our prior copending application Serial No. 759,397 aforesaid. In practicing the invention with the aid of apparatus such as that here shown, the gas to be purified, such as flue gas, enters the scrubbing tower C at A and leaves at B, said tower containing any suitable scrubbing surfaces. Liquor from the scrubber passes out through the scrubber hopper D and passes into the delay tank E at V from which it is returned to the scrubber by the pump F and piping F'. This arrangement comprises the main recirculation liquor system.

In order to remove accumulated solids, a portion of the liquor leaving the scrubber is purged off at the overflow pipe P to the settler S. A part of the clear overflow from this settler passes to the tank T and part is used for mixing the lime slurry. The sludge from the settler is dewatered on a rotary vacuum filter R and the clear liquor collected also in the tank T. The water level in the tank T is maintained constant by addition of make-up water through a float-controlled valve N. Clear liquor, mixed with make-up water from tank T, is delivered to scrubber C by piping M' and pump T', the flow being controlled by valve M. The total rate of purge may be controlled by variation in the supply of returned liquor at the valve M.

Part of the clear settled or filtered liquor from the settler S is passed by the line G to a lime slurry preparation plant H. This lime slurry is added to the circulating liquor system at L before the delay tank E. Any sludge settling in the delay tank E may be removed through the valved outlet Q.

In practicing the invention with the aid of apparatus such as that just described, the liquor rate and/or the addition of make-up water are controlled, as previously pointed out, so that the degree of supersaturation of the liquor at the base of the scrubber does not exceed the least value previously referred to and applicable to the particular scrubbing surfaces employed.

It will be understood that the scrubber may be of any convenient type, including counter-current and co-current scrubbers and those in which the gas flows transversely across a series of irrigated baffles or packing members. Preferably, however, we make use of the scrubber described in Learmonth's application No. 731,732, filed June 21, 1934.

As many apparently widely different embodiments of this invention may be made without departing from the spirit and scope thereof, it is to be understood that we do not limit ourselves to the specific embodiments thereof except as defined in the appended claims.

We claim:—

1. In a gas washing process in which gases containing oxides of sulphur are washed with aqueous lime containing liquor saturated with respect to calcium sulphite and calcium sulphate, said gases being passed in contact with scrubbing surfaces fed with said liquor to cause supersaturation with respect to calcium sulphite and calcium sulphate, said liquor being constantly recirculated, replenished in lime by an amount approximately equivalent to the absorbed sulphur oxides, and treated so as to remove practically the whole of its supersaturation due to calcium sulphite and sulphate before feeding it again over said scrubbing surfaces, and the insoluble solids collecting in the system being removed by purging a part only of the circulating liquor without settling the bulk of the liquor, the step of controlling the relative amounts of gas and liquor in contact therewith so that the degree of supersaturation of the liquor in contact with the final scrubbing surfaces does not exceed 4 milligram equivalents per litre of calcium sulphite and 3 milligram equivalents per litre of calcium sulphate when the scrubbing surfaces are made of material which is substantially non-corroding under the conditions of use, and does not exceed 2.3 milligram equivalents per litre of calcium sulphite and 2 milligram equivalents per litre of calcium sulphate when the scrubbing surfaces are made of material which tends to corrode under the conditions of use.

2. A process as claimed in claim 1, in which the lime is added to the liquor immediately after it leaves the scrubber.

3. A process as claimed in claim 1, in which the recirculated liquor contains at least 3 per cent each of suspended calcium sulphite and sulphate.

4. A process as claimed in claim 1, in which the liquor is treated to remove dissolved carbon dioxide prior to the desupersaturation treatment.

GORDON NONHEBEL.
JOHN LINDON PEARSON.